United States Patent [19]

Siegal et al.

[11] Patent Number: 4,700,369
[45] Date of Patent: Oct. 13, 1987

[54] ATHLETIC ACTIVITIES COUNTER

[75] Inventors: Joseph J. Siegal, 1056 S. Salem St., Apt. 206, Aurora, Colo. 80012; John A. Carlin, Denver, Colo.

[73] Assignee: Joseph Siegal, Aurora, Colo.

[21] Appl. No.: 823,331

[22] Filed: Jan. 28, 1986

[51] Int. Cl.<sup>4</sup> .................. G06M 1/02; H01H 35/00
[52] U.S. Cl. .................................. 377/24; 377/5; 200/52 R
[58] Field of Search ............ 377/5, 24, 24.2; 340/323 R; 235/91 R; 368/10, 2, 3; 200/85 R, 52 R; 272/4

[56] References Cited

U.S. PATENT DOCUMENTS

| | | | |
|---|---|---|---|
| 2,806,699 | 9/1957 | Spooner | 272/140 |
| 3,363,243 | 1/1968 | Morley | 272/4 |
| 3,510,631 | 5/1970 | Weinberg | 377/9 |
| 3,544,989 | 12/1970 | MacCreadie | 272/4 |
| 3,676,696 | 7/1972 | Lev et al. | 340/323 |
| 3,678,496 | 7/1972 | Stalp | 340/323 |
| 3,784,768 | 1/1974 | Hunt | 200/52 R |
| 3,916,214 | 10/1975 | Coble, Jr. et al. | 340/323 |
| 3,920,940 | 11/1975 | Brown et al. | 272/4 |
| 3,944,763 | 3/1976 | Beierwaltes | 200/52 R |
| 4,109,030 | 4/1977 | Tamiz | 427/93 |
| 4,263,736 | 4/1981 | Beierwaltes et al. | 340/323 |
| 4,475,016 | 10/1984 | Berger | 200/86 |
| 4,476,358 | 10/1984 | Capecchi | 272/4 |
| 4,518,266 | 5/1985 | Dawley | 368/10 |
| 4,530,105 | 7/1985 | Rabinowitz | 377/12 |

FOREIGN PATENT DOCUMENTS

607156 11/1978 Switzerland .

OTHER PUBLICATIONS

Tapeswitch Press-At-Any-Point Ribbon Switches, Tapeswitch Corp. of America, Jun. 1970.

*Primary Examiner*—John S. Heyman
*Attorney, Agent, or Firm*—Dorr, Carson, Sloan & Peterson

[57] ABSTRACT

This invention provides a highly portable device for counting athletic activities of a repetitive nature, e.g., pool laps swum, track laps run, pushups, situps, etc. The device has a mat-like body flexible enough to be rolled up and carried in a handbag. It is comprised of: (1) a watertight upper section containing a weight for anchoring the device during use, battery and circuit means for powering a lap counting electrical circuit, (2) a middle section for displaying an athletic activities card and (3) a watertight lower section containing a lap count display and a touch pad which operates the lap counting electrical circuit in a manner such that the display count advances by one for each touch of the pad.

4 Claims, 9 Drawing Figures

ATHLETIC ACTIVITIES COUNTER

FIELD OF THE INVENTION

This invention relates to counting devices used to count repetitive athletic activities such as the number of laps swum up and down a swimming pool, the number of laps run around a running track, the number of pushups, situps, etc. accomplished in a given athletic routine.

BACKGROUND OF THE INVENTION

Various devices have been produced to aid athletes such as swimmers, runners and calisthenics enthusiasts in counting laps and repetitions. For example:

U.S. Pat. No. 4,518,266 (the 266 patent) teaches a swimming lap counter housed in a molded plastic case formed with a carrying handle on its top and somewhat resembling a suitcase. In use, the device is positioned by securing a cord to the handle and to some neighboring stationary object or to some separate, heavy, and yet still movable, object such as the hard rubber retrieval brick suggested in the 266 patent. This device provides split timer, elapsed time and lap count information on the display side of the case.

U.S. Pat. No. 3,944,763 (the 763 patent) teaches a swimming lap counter having a rigid, nonconductive baseplate adapted to be mounted on a swimming pool wall. A normally nonconductive planar pressure sensitive pad is seated on the baseplate and is adapted to become selectively conductive upon application of pressure and thereby, in conjunction with the disclosed circuitry, time the swimmer's trip up and down the pool. The baseplate is made of a rigid, nonconductive material such as polystyrene or polyvinylchloride and has a suggested width of from 4 to 8 feet so that it spans a major portion of the width of a racing lane in a swimming pool. The vertical baseplate is also provided with a rigid horizontal section for attaching the device to a swimming pool gutter or to a starting block.

U.S. Pat. No. 3,784,768 (the 768 patent) teaches a lap counter having a pair of rigid, spaced, facially confronting electrically conductive plates activated by contact with a face plate. This patent is particularly concerned with preventing false counts and other errors, in part by providing a level of water between the plates which is equivalent to the level of water surrounding the disclosed signaler.

Swiss Patent No. 607,156 teaches a lap counter whose touch pad is a pneumatic bag. Upon application of pressure to the bag, a puff of air is produced which forces a bellows and crank level to rotate a digital display in a bulb-like housing located on the deck of the swimming pool.

Even though all of these prior art devices accurately perform their intended timing and counting functions, they do present certain problems, particularly to the casual, individual athlete, as opposed to those involved in more formal competitive events attended by workers, judges, etc. The problems associated with the above devices generally fall into the categories of transportation convenience, placement, reading and costs. For example, all of the above devices have a rigid, vertical planar face of some kind as part of their overall configuration. This means that, at best, these devices represent distinct pieces of baggage to be carried about by the athlete. The 266 patent recognizes this inherent problem by providing a carrying handle at the top of this suitcase-like device.

The counting devices taught in the 763 and 768 patents do not disclose carrying handles of the type taught in the 266 patent. Moreover, the 763 and 768 devices are generally characterized by their having large, rigid planes and smaller rigid vertical planes which are used for affixing these devices to swimming pool gutters, to the edges of swimming pools and to starting blocks. All of these characteristics imply that such devices (1) can not be conveniently carried, e.g., in the handbags or gym bags frequently used by athletes, (2) can not be stored in those clothes lockers typically found in locker rooms and (3) can not be conveniently carried by an individual. They are also relatively complex and/or expensive.

After being transported by whatever means, the above noted prior art devices then must be anchored for use at the end of a swim lane by whatever means available and/or dictated by the size and configuration of each particular device. For example, the counter of the 266 patent uses its carrying handle to receive and tie one end of a cord whose other end is tethered to some stationary object near the pool. However, convenient stationary objects may not exist at every poolside; the cord may extend some distance from the edge of the pool and therefore represent a hazard to people walking inthe poolside area; the cord may be forgotten; or a heavy but still portable object, such as the diving brick suggested in the 266 patent, may not be available at the pool and, if present, it may itself present a hazard to those walking in the poolside area.

Moreover, the above prior art devices are somewhat limited to swim lap counting. This follows from their large, rigid structures and from their having an L-shaped cross sectional configuration. They can not, for example, be conveniently used to count pushups via contact with the athlete's chest as it is lowered to floor level. That is to say, if these devices were placed under the athlete's chest, the chest would tend to touch the raised area under the perpendicular base portion of their L configurations rather than their touch pads which are typically located on the stem portion of the L which would be inclined relative to a floor when these devices were positioned for contact with the user's chest.

SUMMARY OF THE INVENTION

This invention overcomes the above problems by providing an athletic activities counter in the form of a mat-like body which is flexible enough to be rolled up and carried in an ordinary gym bag or similar handbag. The mat-like body is comprised of three sections. An upper section is provided with a weight for positioning the device, for example at the edge of a swimming pool. The upper section further comprises a watertight section for containing at least one battery and its associated circuit means for powering a lap counting electrical circuit. Preferably, the weight will comprise at least fifty percent of the weight of the entire counting device. The weight can be attached to any part of the upper section, but most preferably it will take the form of a board which also serves as a part of a mounting board for the battery and its associated circuit means inside the watertight section. The watertight upper section also should be provided with a resealable opening for replacing the battery or batteries. By way of example, watertight zippers will adequately perform the required unsealing and resealing capability.

A middle section of the device is adapted for displaying an athletic activity card. Such a card can provide various technical and/or motivational information e.g., calories per lap, per pushup, etc. Preferably the athletic activity card is replaceable with other activity cards which may contain different information and motivational messages apropos to a particular athletic activity and/or to the athlete's progress in that activity. The activity cards should be made of a flexible material (e.g., vinyl, acetate, plastic etc.) capable of being rolled up. Preferably the card should also be capable of making a 90 degree bend without putting a permanent fold or crease in the card. It can be attached to the middle section of the counter by any convenient means, e.g., snaps, Velcro, display window etc. A display window having one open reinforced edge for facilitating inserting and removing the activities card is, however, a highly preferred method of attaching such a card to the counter. Obviously such a display window should be made of a clear, flexible, material such as clear acetate or clear plastic, sheet-like, materials. The middle section also will most preferably contain a hollow watertight region through which electrical wires can pass from the upper section to a watertight lower section of the mat-like body.

The lower section contains, in an appropriate electrical interconnection, a lap counter display and a switch for advancing a lap counting electrical circuit which is most preferably also located in the lower section. Preferably, the lower section is not as heavy as the upper section. With this counterweighting arrangement, the flexible body of the counter may, in the context of counting swim laps, be draped over the edge of a swimming pool and be held in place by virtue of the fact that the upper section, with its greater weight, will hold the device in place. Preferably the device will be positioned such that the upper and middle sections will lie on the pool's deck. Hence only the lower section hangs vertically over the edge of the pool. In order to supplement the placement function of the weight, portions of the back of the mat-like body also may be provided with a high friction surface, such as that provided by suction cups, nap materials, Velcro or other similar means for holding the device in place during use and/or for maintaining the device in a rolled up configuration, particularly for transport in a handbag.

The lap counter and its associated circuitry, which is most preferably housed in the lower section, is in electrical connection with the battery means located in the upper section by means of electrical wires which preferably pass through the body of the middle section. The wires should be flexible enough to be rolled up along with the middle section without being damaged by the process of being rolled up. In a highly preferred embodiment of this invention, the upper section contains an on/off switch which activates and deactivates the lap count display and its associated electrical circuitry. In this arrangement, the lower section contains only the lap counting electrical circuit, the lap count display and the touch pad which advances the displayed count in a display window located near the touch pad.

In one highly preferred embodiment of this invention the lap count display is activated with only one zero displayed in the units position. The tens and hundreds positions are presented in a completely blank state upon activation of the counter. As a practical matter, the counter need only have the capability of counting up to the number 999. Again, information relating to any given number displayed can be correlated with information about pool length, track length, etc. placed on the activities cards. This information can then in turn be related to other kinds of information of interest to athletes, e.g., calories burned, typical heart rate, conversion of pool or track lengths into miles and so forth.

As another practical matter, the counter's mat-like body should be less than about 2 feet wide and less than about 3 feet long. A counter about 8 inches wide by 14 inches long, having upper and lower sections each about 8 inches by about 3 inches, is a particularly convenient size for rolling up and carrying the counter in in a gym bag. The exterior of this athletic activities counter is most easily fashioned from two cloth-like pieces: (1) a top which houses the watertight upper section and the watertight lower section as well as the activities card holding middle section and (2) a base to which the top is attached. Aside from a lap count display window, which is preferably made from a clear acetate or clear plastic material, the remainder of the top and base can be made of any suitable water repellent material e.g., vinyl, waterproofed canvas and the like. The top housing can be attached to the base by any number of known techniques such as stitching, gluing, heat sealing etc. One particularly straightforward method of making these devices is to affix the circuitry to the base, stitch the top housing to the base and then dip the resulting mat-ike body in a polyvinyl coating in order to make the entire device watertight and water repellant.

In another highly preferred embodiment of this invention the on/off switch which activates and deactivates the device and the touch pad switch which advances the counter are positioned under the surface of the material which forms the top housings. That is to say that the switches themselves do not protrude through the surface of the material which forms the top housing. Hence the switches are not exposed to water. As previously noted, the material which forms the top housing can be a soft material (e.g., vinyl or canvas, etc.) which is pliable and loose fitting such that the pressure operated switches underneath the surface of the material can be activated simply by hand or finger pressure upon the exterior surface of the material at appropriately marked places. To this end, the top of the upper section can have the words "on" and "off" painted or silk screened upon it above the place where the "on" and "off" switches are located within the top housings. Similarly the top of the lower section above the touch pad switch can be marked "touch here to advance" or some other similar directive. Bright colors are highly preferred for such directive words, as well as for any borders, logos and the like which may be placed on the counter. Such colors will aid the athlete in visually locating the device while swimming, running etc.

DETAILED DESCRIPTION OF THE PREFERRED EMBODIMENTS

Figure 1:
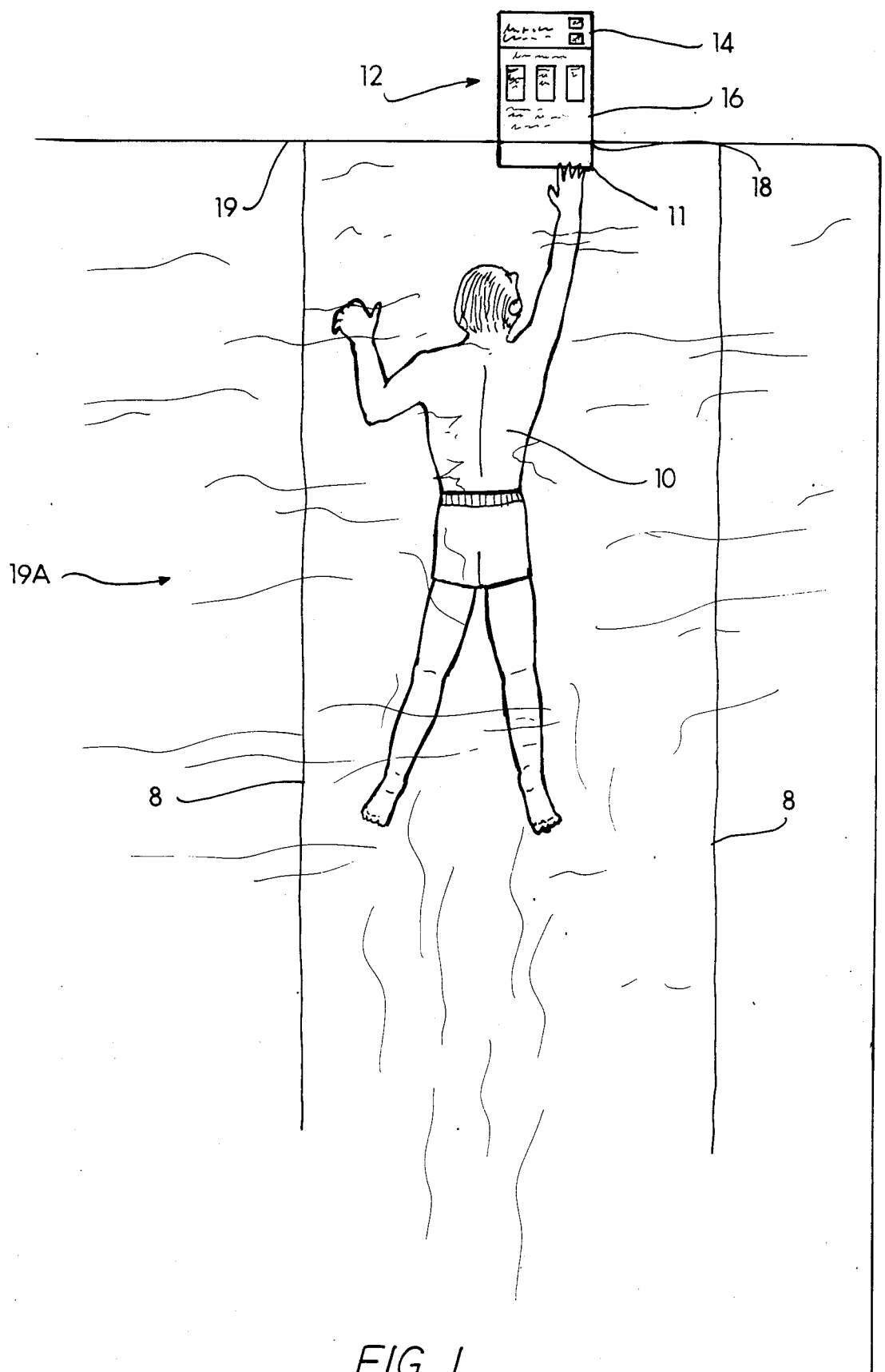
FIGS. 1, 2 and 3 respectively depict the athleic activities counter disclosed herein being used by a swimmer, a jogger and a person doing pushups.

FIG. 1 shows the athletic activities counter positioned for use at one end of a swimming pool lane 8. It is shown draped over the edge 19 of the pool in the manner shown in the side view of FIG. 6. A swimmer 10 is depicted as being about to touch the counter's touch pad 11. Use of the counter 12 in this way would preferably count one lap up and down the pool for each touch of the pad. The counter 12 itself is comprised of an upper section 14, a middle section 16 and a lower section 18. As is better shown in FIG. 6, when the counter 12 is used in the context of swim lap counting, the upper section 14 and the middle section 16 lie flat upon the deck around the pool while the lower section 18 is draped over the edge 19 of a swimming pool 19A.

Figure 2:
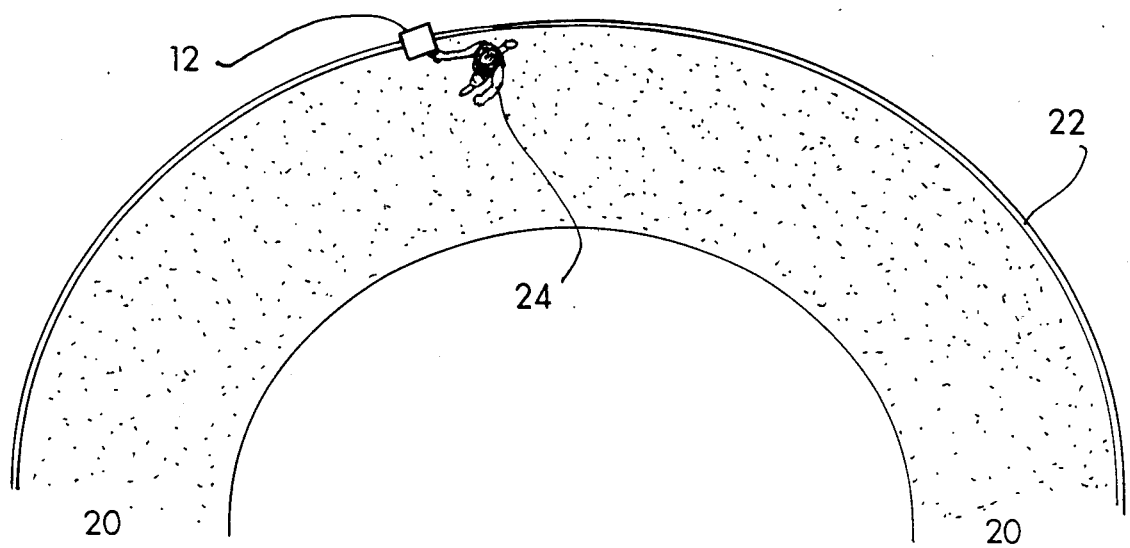
Figure 7:
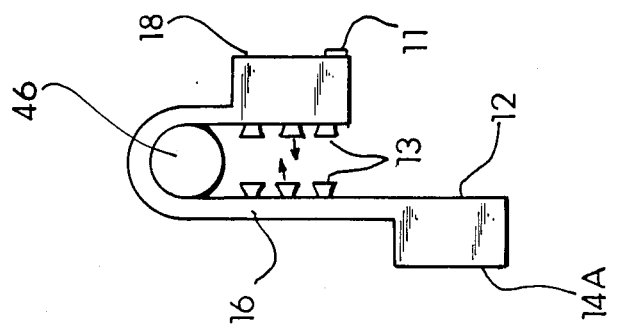
FIG. 7 shows the athletic activities counter draped over a rail of the type often found around running tracks.

FIG. 2 is a plan view of a running track 20 having an outside rail 22 over which the counter 12 is draped in the manner suggested in FIG. 7. A runner 24 is shown about to touch the counter 12 and thereby count one lap around the circular track 20.

Figure 3:
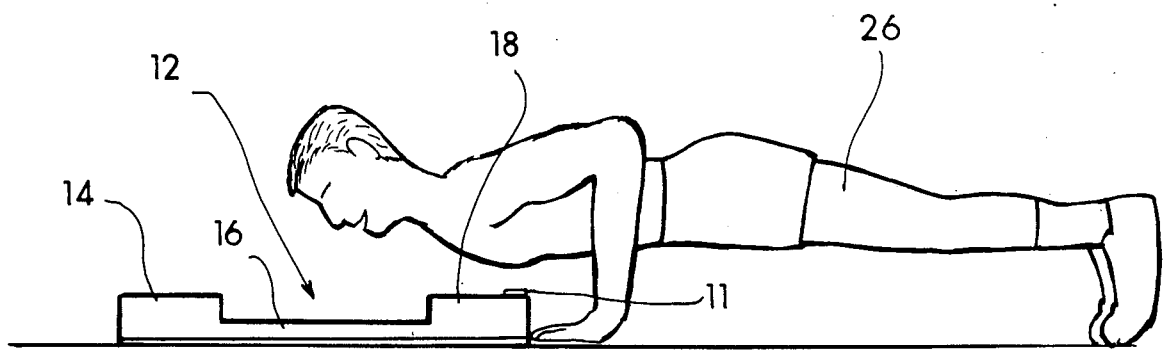

FIG. 3 shows a man 26 doing pushups over the lower section 18 of the athletic activities counter 12. The lower end 18 of the counter contains a touch pad 11 hereinafter more fully described which comes into contact with the user's chest as it descends during a pushup repetition. Hence each touch of the man's chest to the touch pad 11 counts one completed pushup.

Figure 4:
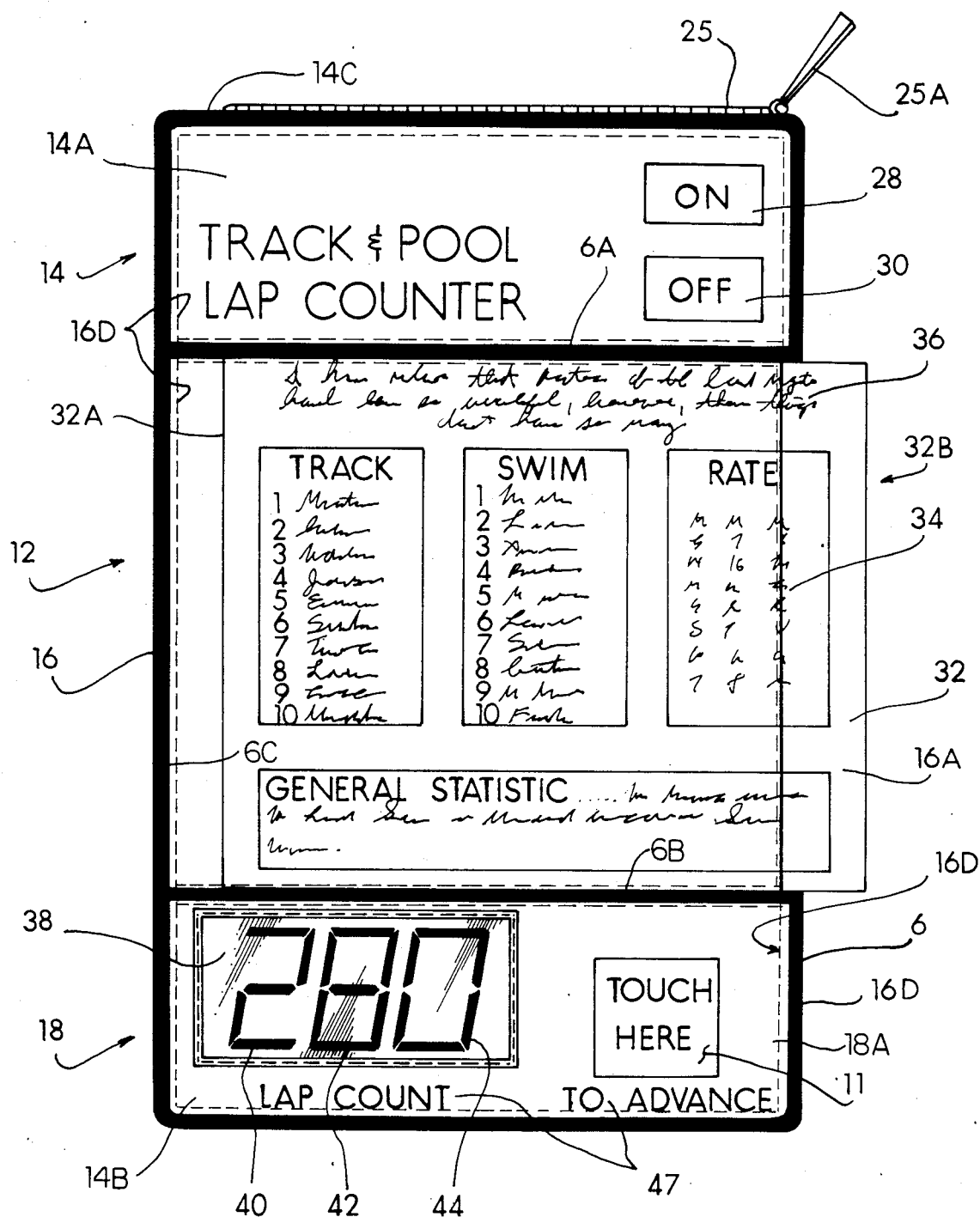
FIG. 4 is a plan veiw of the athletic activities counter emphasizing the arrangement of its upper, middle and lower sections.
Figure 8:
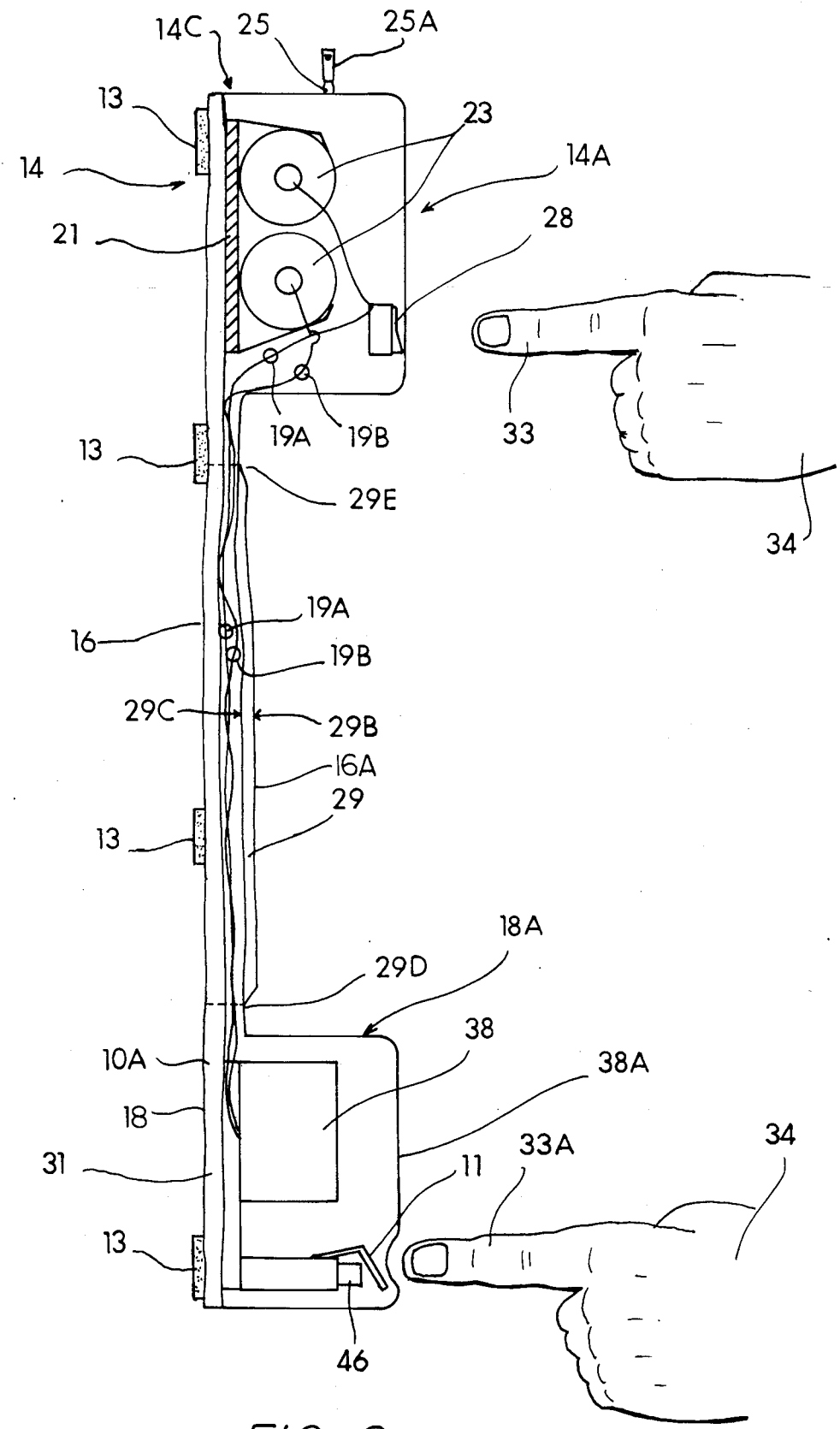
FIG. 8 is a cross sectional view of a preferred embodiment of the athletic activities counter.

FIG. 4 shows a detailed plan view of the top of the counter 12. The heaviest lines 6, 6A, 6B, and 6C help illustrate that the counter 12 is comprised of three main sections 14, 16 and 18. The upper section 14 has a watertight compartment 14A which houses one or more batteries and their associated circuitry (not shown). The insides of compartment 14A, and hence the batteries, are made accessible by means of a resealable opening, for example, such as that provided by zipper means 25 and 25A shown at the top of upper section 14. Most preferably, such resealable openings are located in the center of the topside panel 14C of the watertight compartment 14A. An "on" directive 28, and an "off" directive 30 are shown on the top surface of watertight compartment 14A. It is to be understood that the on/off directives 28 and 30 are located just above the actual switches (not shown) which physically activate and deactivate the counter 12. FIG. 8 serves to show that such switches e.g., switch 28 and switch 46 are preferably located beneath the surface of the material which forms the top surface of the housings 14A and 18B.

The middle section 16 is shown bounded by heavy lines 6, 6A, 6B, and 6C. An activities card 32 having leading edge 32A and trailing edge 32B is shown being inserted from the right side into a window section 16A which constitutes a major portion of the middle section 16. The edges 6, 6A, 6B and 6C of the window section are shown reinforced by stitching 16D. Such stitching can also conveniently be used around the borders of all three of the major sections 14, 16 and 18 as indicated. Item 34 represents tabular data which might be found on the activities card 32. Item 36 is intended to represent other additional written data, information or motivation materials apropos to the particular activities card then being displayed in window 16A.

In FIG. 4, the lower section 18 has two main observable features, the count display 38 and the touch pad 11. A representative count (i.e., 280) is shown which happens to have numbers in the hundreds place (40), tens place (42) and ones place (44). As previously noted however, activation of the counter preferably commences with a single "0" in the ones place 44. The first touch of the touch pad 11 would preferably produce a "1" in the ones place 44 rather than a "001" representation. As previously noted, the touch pad 11 is preferably nothing more than the top surface of the material from which the lower section housing 18A is constructed. As is better seen in FIG. 8, the actual switch 46 which advances the display 38 is located beneath the surface of the material which forms the housing 18A and therefore is not shown in the plan view of FIG. 4.

Figure 5:
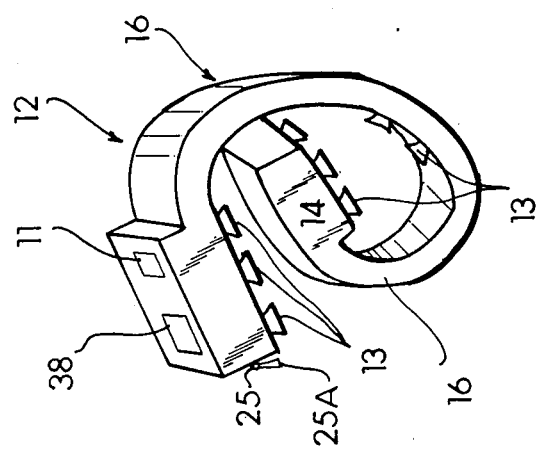
FIG. 5 is a perspective view of the athletic activities counter rolled up for carrying in a handbag.

FIG. 5 shows the athletic activities counter 12 rolled up for placement in a gym bag not shown. The upper section 14 and the lower section 18 are shown provided with adhering means 13 such as suction cups for (1) holding the counter 12 to a flat surface such as a swimming pool deck, (2) holding the counter in the "rolled up" configuration shown in FIG. 5 or for (3) positioning and holding the device 12 around an object such as the running track rail 46 shown in FIG. 7.

Figure 6:
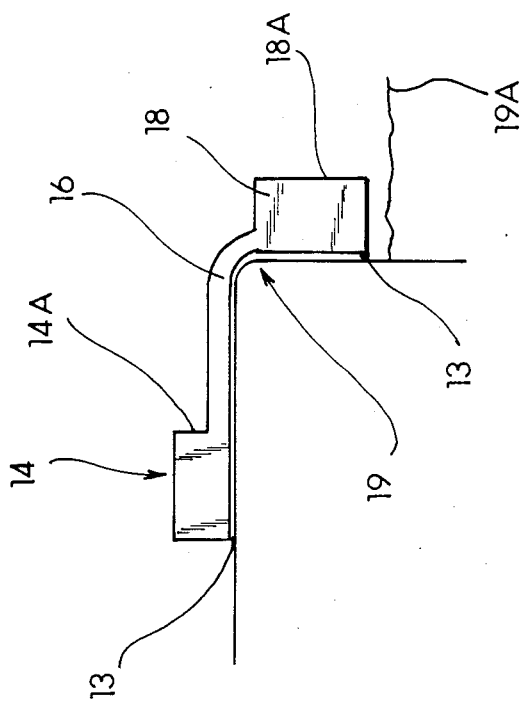
FIG. 6 is a side view of the athletic activities counter draped over the edge of a swimming pool.

FIG. 6 shows the lower section 18 of the counter 12 draped over the edge 19 of a swimming pool 19A. The heavy bottom surface 13 of the counter 12 is intended to represent a rough or adhering surface means such as Velcro, rough nap or the suction cups suggested in FIGS. 5 and 7. Such an adhering surface can aid the weight 21 shown in FIG. 8 in performing its function of holding the counter 12 in place during actual use by the athlete.

FIG. 7 shows the counter 12 draped over a rail 46 such as the one depicted in FIG. 2.

FIG. 8 is a cross sectional view of a preferred embodiment of this invention. It is comprised of a base 10A of a continuous piece of material such as vinyl which is flexible enough to be rolled up. The underside of the base 10A is shown provided with an adhering surface 13 such as rough nap, Velcro and the like. Such a surface may supplement the function of the weight 21 in positioning and holding the counter 12 during use. The top side 14C of the upper section 14 is shown provided with a zipper 25 and a zipper puller grip 25A. The top surface of the upper section housing 14A, the top surface 16A of middle section 16, the window 16A of the middle section 16 and the top surface of lower section housing 18A are all made of a material flexible enough to be rolled up. The top surfaces 14A and 18A also should be relatively loose and pliable, i.e., subject to being depressed by the finger pressure suggested in FIG. 8 in select locations e.g., at points 33 and 33A which are located above switches 28 and 46 respectively. For example, the touch pad 11 is shown being depressed by a finger 33A of the hand 34 of a user not shown. Information and directives e.g., "lap count", "touch here to advance" is preferably printed or silk screened on to the top of the material which constitutes the top of lower section housing 18A. The count display window 38A can be located above switch 46 as shown in FIG. 8 or next to it as suggested in FIG. 4.

An activities card display window opening 29A defined by the space 29B to 29C, i.e., between the top surface 16A of the middle section 16 and the bottom of the window 29, is shown open along one of its edges, e.g., from 29D to 29E in order to insert, remove and otherwise interchange activities cards such as the card 32 shown in FIG. 4. Electrical wires 19A and 19B are shown extending through the middle section 16 from the batteries 23 in the upper section 14 to a lap counting circuit means 31, which is electrically connected to lap count display 38 and to touchpad switch 46 shown being depressed at touchpad 11 by finger 33. Directive information 47, e.g., "touch here" is shown in representative places.

Figure 9:
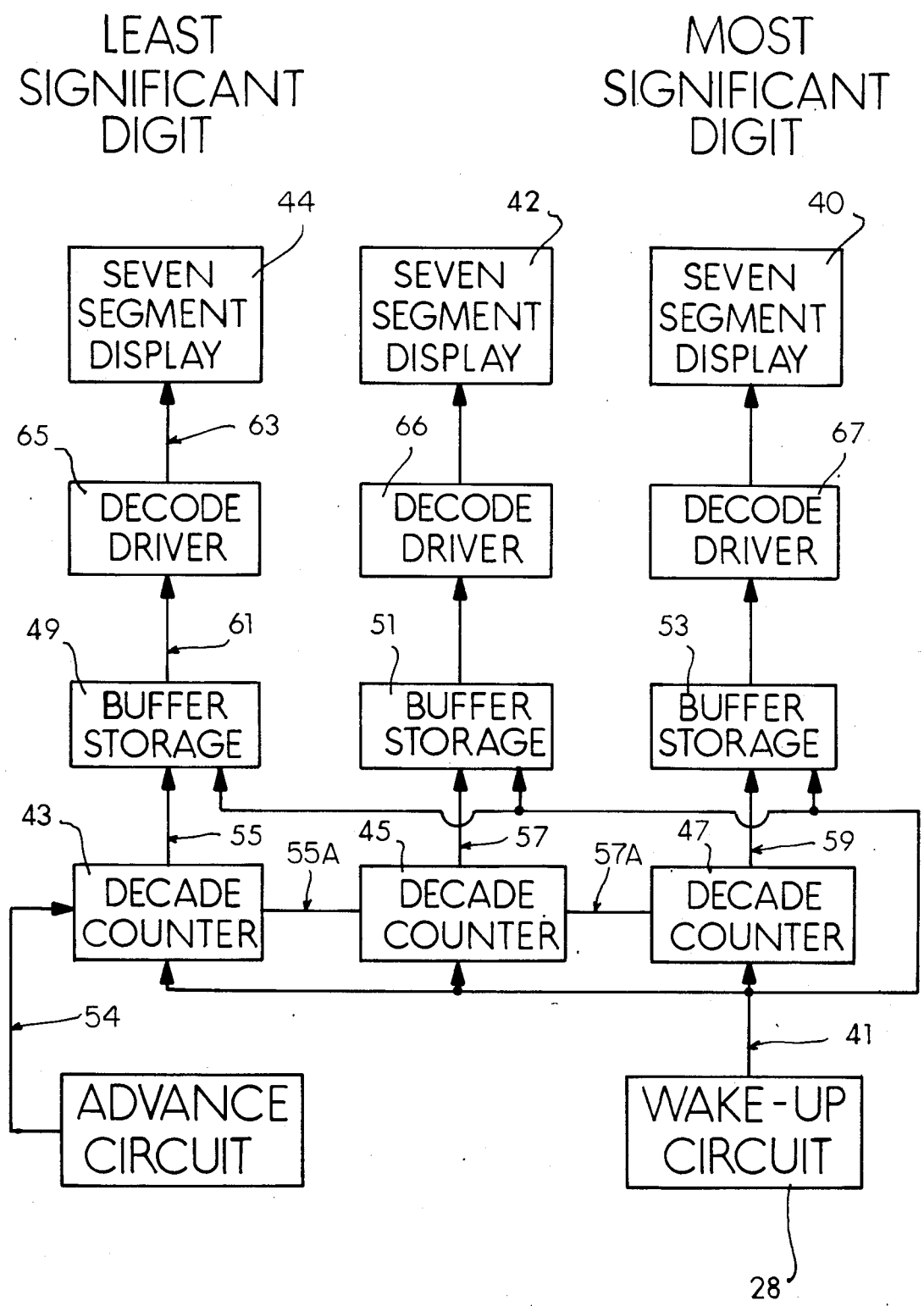
FIG. 9 depicts a representative circuit for carrying out certain preferred activation and display features of this invention.

FIG. 9 is a block diagram which illustrates one of the many electrical circuits which can be employed to achieve the preferred counting function of this invention. The counter 12 itself may be a standard item or it may be customized in ways hereinafter more fully disclosed. In either case, when throwing the "on" switch 28, voltage becomes available to all necessary components of the circuit. As indicated this might be thought of as a "wake-up circuit". It places a pulse on line 41 which resets decade counters 43, 45 and 47 and buffer storage circuits 49, 51 and 53. Upon activation of the circuit, it is highly preferred that only the least significant digit display 44 shall show a "0" and that the "tens" display 42 and the "hundreds" display 40 shall be completely blank as opposed to displaying "0s". This arrangement not only conserves energy, it also minimizes user confusion when reading the count during the progress of an athletic endeavor.

When a pulse is placed upon line 54, the output of the advance circuit, the first decade counter 43 will advance by one integer. That is to say, the decade counter circuit responds to its input pulse by incrementally advancing the value of the decade binary code then present. Each up-dated code is stored in buffer register 49 through line 54. When the decade code value increments up and cycles through the value "9" and back to "0", decade counter 43 pulses the carry output in line 55A to the next in-line decade counter 45. The binary value that is stored in buffer register 49 is latched at its output on line 61. This value shall persist on line 61 until an incrementing pulse is again produced.

Decode driver circuit element 65 converts a four bit binary code that is present on line 61 to a seven wide line signal on line 63 which in turn provides a current to drive the seven segment display device 44. Each of the other in-line decode drivers 66 and 67 functions in the same manner as the first decode driver 65. The previously described operating functions regarding the buffer storage register 49, the decode driver 65 and the seven segment display device 44 can be regarded as a guide to the operation of the other buffers 51 and 53, the other decode drivers 66 and 67 and the other seven segment display devices 42 and 40. That is to say, for example, the pulse signal on line 57B responds similarly to the next in-line decade counter 47 in a way analogous to that in which the first decade counter 43 responds to the pulse on line 55.

The term "decade" in the decade counter circuit indicates that for every ten pulses to its input (at line 55), one pulse is produced at its output (line 55A). This takes place while the circuit provides a four bit wide signal in binary form on line 56 as to its present value, i.e., on or between the values "0" and "9". As shown in FIG. 9, the next in-line decade counter circuit 45 is provided with outputs, i.e., lines 57 and 55B. Again, the second decade counter 45 functions like the first decade counter 43. Similarly, the last decade counter 47, functions like the second decade counter 45 using line 55B as its pulsing input (analogous to the pulse on line 55A) except for the fact that the last decade counter carry output is not thereafter required since this circuit is concerned with the most significant figure place 40, in the overall circuit function.

Most preferably, the down-line decade counters 45 and 47 provide a "blanking" feature. That is, when a thru value is in operation, displays 42 and 40 show a blank rather than a "0". For example, if the integer 7 was in the least significant decade counter 43, then the display would indicate "7" rather than "007". Again, this display arrangement cuts power requirements and minimizes the chance of user confusion deriving from the fact that the athlete may only have a moment to note the count due to the strenuous and fast paced nature of some athletic routines.

Obvious variations in the circuit of FIG. 9 can be made without departing from the scope of this invention. For example, it could be provided with a circuit to "de-bounce" the mechanical phenomenon inherent in a physical action switch. This can be accomplished by functioning as a "one shot", device, i.e., a capacitor can be used to delay enough (by virtue of its charge time characteristics) to extend in time beyond subsequent bounce pulses before settling to its static state. With such an arrangement, only one output pulse is produced for any given single switch closure.

While many other changes can be made in the details of the above construction features, it should be understood that such changes should be considered as being within the spirit and scope of this invention as defined by the appended claims.

What is claimed is:

1. A fully portable device for counting swimming laps or other athletic activities of a repetitive nature, said device comprising a mat-like, water-tight housing material flexible enough to be rolled up and further comprising upper, middle and lower section.
   (1) said upper section having a front surface and back surface with adhering means and containing therein:
      a. a weight attached to the back surface and wherein said weight also functions as a mounting for a battery;
      b. a battery for powering a lap-counting electrical circuit in said lower section of the device;
      c. an electrical connection means for connecting the battery to the lap-counting electrical circuit, and
      d. an on/off switch, located underneath the front surface of the watertight housing, for activating the lap-counting electrical circuit;
   (2) said middle section having a front and back surface and containing therein:
      a. a window, located on top of the front surface of the middle section, said window having an open edge for receiving an athletic activity card and
      b. said middle section being hollow for receiving the electrical connection between the battery and the lap-counting electrical circuit; and
   (3) said lower section forming a watertight lower housing having a front and back surface and containing therein:

a. a lap-counting electrical circuit which is connected to the battery via the electrical connection running through the middle section, and a lap count display which commences its display with a zero in the least significant digit place of a lap count display window located in the front surface of the lower section; and b. an advance switch means located under a touch pad area on the front surface of the lower section, for advancing the count in increments of one by physical pressure upon the touch pad.

2. The device of claim 1 wherein the weight comprises at least 50% of the weight of the device.

3. The device of claim 1 wherein the device is less than 2 feet wide and less than 3 feet long.

4. The device of claim 1 wherein the base, the water-tight upper section housing and the water tight lower section housing of the mat-like body are made of vinyl materials sewn together.

* * * * *